(12) United States Patent
Geramifard et al.

(10) Patent No.: US 9,412,361 B1
(45) Date of Patent: Aug. 9, 2016

(54) CONFIGURING SYSTEM OPERATION USING IMAGE DATA

(71) Applicant: Amazon Technologies, Inc., Seattle, WA (US)

(72) Inventors: Alborz Geramifard, Cambridge, MA (US); Sankaranarayanan Ananthakrishnan, Belmont, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/501,562

(22) Filed: Sep. 30, 2014

(51) Int. Cl.
*G10L 15/00* (2013.01)
*G10L 15/06* (2013.01)
*G10L 15/065* (2013.01)
*G10L 25/51* (2013.01)
*G10L 15/22* (2006.01)

(52) U.S. Cl.
CPC ............. *G10L 15/063* (2013.01); *G10L 15/065* (2013.01); *G10L 15/22* (2013.01); *G10L 25/51* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 6,404,925 B1 * | 6/2002 | Foote | ................ | G06F 17/30746 348/480 |
| 8,180,583 B1 * | 5/2012 | Gossweiler | ........... | G06F 1/3231 702/62 |
| 2013/0041650 A1 * | 2/2013 | Phillips | ................... | G06F 17/18 704/2 |

OTHER PUBLICATIONS

Ghahramani, Non-parametric Bayesian Methods, Uncertainty in Artificial Intelligence Tutorial, 2005.
Orbanz, Bayesian Nonparametric Models, Encyclopedia of Machine Learning, Springer US, 2010.
Gershman, A tutorial on Bayesian nonparametric models, Journal of Mathematical Psychology, vol. 56, 2012.

* cited by examiner

*Primary Examiner* — Marcus T Riley
(74) *Attorney, Agent, or Firm* — Seyfarth Shaw LLP; Ilan N. Barzilay; David A. Klein

(57) ABSTRACT

A system that configures a device's operation based on the device's environment. The system may receive scene data describing a scene in which the device will operate. The scene data may include image data, audio data, or other data. A feature vector comprising the scene data may be processed to identify one or more categories to be associated with the scene. Various processing techniques, such as using Bayesian nonparametric models, may be used to categorize the scene data. The device may then adjust its operation based on the one or more selected categories.

20 Claims, 5 Drawing Sheets

CONFIGURING SYSTEM OPERATION USING IMAGE DATA

BACKGROUND

Human-computer interactions have progressed to the point where humans can control computing devices, and provide input to those devices, by speaking Computing devices employ techniques to identify the words spoken by a human user based on the various qualities of a received audio input. Such techniques are called speech recognition or automatic speech recognition (ASR). Speech recognition combined with natural language processing (NLP) techniques may allow a user to control a computing device to perform tasks based on the user's spoken commands. The combination of such techniques may be referred to as speech processing. Speech processing may also convert a user's speech into text data which may then be provided to various textual based programs and applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
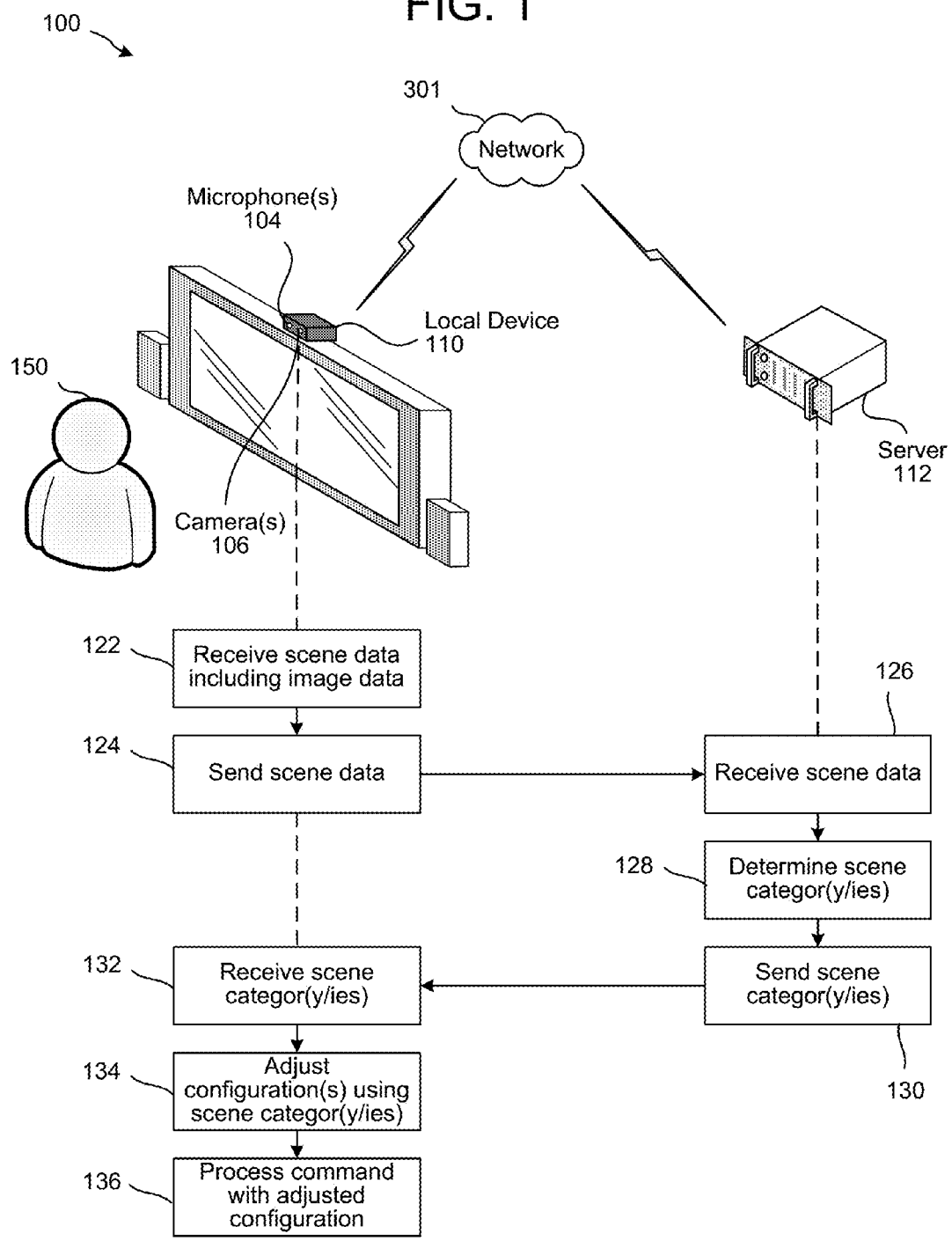
FIG. 1 illustrates a system for adapting operation of a device using scene data, including image data.

Various computing devices are capable of receiving and processing voice commands to execute commands. For example, a user may speak commands to a device and the device may process the command and perform an action such as playing videos, playing music, providing directions, or any number of other tasks. The ability of a device to interpret the user's command properly depends on a number of factors including the quality of the audio, the specific words spoken by the user, etc. Further, certain ambiguities may exist where the device has difficulty determining whether detected words should be interpreted as a command, and if so, what command should be executed. For example, if a device detects a spoken utterance including the words "play chess" it may have difficulty determining whether the utterance was not intended as part of a command to the device, but rather as a statement between two individuals proximate to the device. Further, if interpreted as a command, the device may have difficulty determining whether the command was intended to play a chess video game, play music from the soundtrack of the musical "Chess," or some other command.

To improve decision making by devices which execute user commands, a system is offered that takes into account the environment of the device and the circumstances of the input(s) received by the device. The environment/circumstances may be referred to as the "scene" of the device. In particular, the scene may include video or image data available to the device that shows the environment/circumstances of the device. The image data may come from one or more cameras including those built-in to the device or otherwise accessible to the device. Using the image data, and other data available to the device, the scene may be categorized into one or more descriptive categories. For example, scene categories may include "single individual present," "multiple individuals present," "quiet environment," "loud environment," "daytime," "nighttime," etc. As can be appreciated, many different categories may be present. Further, different categories may exist for different combination of scene characteristics. For example "daytime quiet single individual present" may be a different category from "daytime quiet multiple individuals present." In other embodiments, multiple categories may apply to a detected scene, depending on system configurations described below. Further as described below, the scene may be detected using a combination of a local device and a remote server/device, which may assist in categorizing the scene using the image data and other available data. Also as described below, each scene category may be associated with a likelihood score representing a likelihood that the particular category matches the scene detected by the device.

Once one or more scene categories may be determined by the local device (either on its own or as received from a server). Using the determined scene categories, and/or their associated scores, the local device may adjust certain configurations and/or settings that govern its operation. For example, the device may reconfigure various settings used to interpret spoken commands detected by the device. Specifically, the device may adjust a parameter to decide if a wakeword was received, thus making it more or less likely to wake up to receive commands based on detected audio. An example of this may be if the scene category detected involves a single user facing the device, the device may be more likely to interpret received audio as a wakeword rather than if the scene category detected involves two individuals facing away from the device but toward each other engaged in a conversation.

In another example, the device may adjust a parameter such as a processing threshold to decide if a play command relates to music or a movie. For instance, if the scene category detected involves multiple individuals at a home in what appears to be a party, the device may be more likely to interpret a received "play" command to refer to music, particularly if historical data related to the device indicates that the detected scene category correlates with playing music. Whereas if the scene category detected involves a single individual sitting on a couch facing a television in the evening, the device may be more likely to interpret a received "play" command to refer to a movie, again particularly if the detected scene category relates to historical data indicating a tendency to receive movie play commands when such a scene is detected.

An illustration of a system to adjust a device operation based on a detected scene is shown in FIG. 1. As seen in FIG. 1, system 100 includes a local device 110 in communication with a server 112 over network 301. The local device 110 is illustrated as a set-top box, but may be any configuration of device. Further, the local device 110 is illustrated as located with a home entertainment setup, but may be located anywhere. The system may receive data from a microphone(s) 104 and camera(s) 106. The microphone(s) 104 and camera(s) 106 are illustrated as incorporated into the local device 110, but may be physically separate yet in communication with the system 100 (such as in communication with the local device 110 and/or the server 112), for example over network 301. A user 150 may be present and giving spoken commands to the local device 110.

The local device 110 receives (122) scene data. The scene data may include image data from camera(s) 106. The image data may be still images or may be video data. The scene data may also include a variety of other data that may assist the system 100 in determining a scene category. Such scene data may include, for example, audio data (such as from microphone(s) 104), day/time data, weather data, location data (i.e., coordinates of or travel data of local device 110), historical usage data, data regarding proximate devices (such as cell phones within a certain range of local device 110 and the identities of the cell phones' users), etc. Processing the scene data may involve significant computational resources. Thus the local device 110 may then send (124) the scene data to server 112 for processing as the server 112 may have more computing power than local device 110 and may be able to process the scene data more quickly. The server 112 then receives (126) the scene data and processes the scene data to determine (128) one or more scene categories. Each scene category may be associated with a likelihood score. The processing of the scene data may involve the use of machine learning techniques, such as Bayesian nonparametric techniques, classifiers, and other techniques described below.

Once the scene categories are determined, the server 112 then sends (130) the categories, and possibly their scores as well, to local device 110 where they are received (132). The local device then adjusts (134) one or more configuration(s) using the scene categories. The adjusted configuration(s) are then used to process (136) incoming commands to the local device 110. Thus the local device 110 may be configured to process incoming commands based on one or more detected scene categories.

Although the illustration of FIG. 1 shows certain steps being performed by local device 110 and others by server 112, the system 100 may be configured in any manner such that the various operations may be performed in any combination between the local device 110 and server 112. In another example, the server 112 may determine how the local device 110 should adjust (134) its configurations based on detected scene categories and may send the local device 110 instructions to alter the local device's 110 configurations rather than the server 112 sending the local device 110 the scene categories themselves. In other embodiments other steps may be added or the method of FIG. 1 altered to accomplish the objective of configuring system 100 operation based on detected scene categories. For example, the local device 110 may preprocess certain scene data before sending it to the server 112. Other examples and embodiments are also possible.

Scene data used to determine the scene category may be data that is taken within a short window of time (for example, a second or two of video data) or may include data that is taken over a longer window of time (for example, historical data describing the operation of the system 100 under various conditions (including how the system 100 may operate in different scene categories). Scene data may include raw data (such as the image data determined by a camera) or various levels of processed data. In one example, image data may be processed to determine a relative level of motion detected in the image data. In another example, even further processing may occur on the image data, for example to determine an emotional state depicted by an individual in the image data, such as whether an individual detected in image data appears happy, sad, etc. Similar processing may be performed on audio data, for example determining whether an individual detected in audio data is happy, sad, etc. Further, data matching may be performed such that received audio of an individual speaking may be matched to an individual appearing in image data using techniques such as echo location using a microphone array, etc. Other types of scene data my include the position of detected individuals, how many faces are detected, the angle of detected faces, the ambience of the room the time of day, etc. As can be appreciated, many types of data may be considered scene data when categorizing the scene and configuring operation of the system.

The system may compile scene data used to determine a scene category into a feature vector, which is a data structure including the various data points (called features) that describe aspects of the scene. The feature vector may be processed by the system 100 to determine a likelihood that the detected scene aligns with one or more scene categories. As the scene data to be considered may include many different data points, the feature vector may be large, and processing the feature vector to determine potentially matching scene categories may be a computationally intensive task. Thus it may be performed by server 112 as described above, with the results passed to the local device 110 over network 301. In one embodiment the feature vector representing a particular scene may be compiled by a local device 110 and sent to the server 112. In another embodiment the local device 112 may send a partial feature vector to the server 112 where the server 112 may add additional scene data available to the server 112 to the feature vector. For example, the server 112 may include, as scene data in the feature vector, the identity of other users in proximity of the local device 110 as detected by a cellular communications network. In another example, the local device 110 may send the server 112 various data that the server 112 may compile into a feature vector.

The feature vector of scene data is analyzed to determine what category should be assigned to the scene based on the scene data. Due the complex calculations involved with determining one or more scene categories, various machine learning techniques may be applied. One such technique is using Bayesian nonparametric models. Bayesian nonparametric modeling takes an input sample (for example, a feature vector) and processes the input sample to determine a likelihood that the input sample should be associated with one or more configured categories. Also, the Bayesian nonparametric model may also return a likelihood that the input sample should be associated with a new category, one that has not yet been configured. Thus use of Bayesian nonparametric modeling may allow for new categories to be configured as the system continues operation and is not limited to assigning categories that have been preconfigured (which is true of other techniques such as Bayesian parametric modeling.

Processing input samples using Bayesian nonparametric models involves complex mathematical processes that are known to those skilled in the art. Such processing is described, for example, in Ghahramani, Z., "Nonparametric Bayesian Methods" (Uncertainty in Artificial Intelligence Conference, 2005), Orbanz, P. and Teh Y., "Bayesian Nonparametric Models" (2010), and Gershman S. and Blei D., "A tutorial on Bayesian nonparametric models," Journal of Mathematical Psychology 56 (2012) 1-12 [available online Sep. 1, 2011]. The above documents are herein incorporated by reference in their entireties. For present purposes, the below will illustrate processing using Bayesian nonparametric models at a high level, though use of the more complex techniques such as those described in the above documents and otherwise generally known in the art is envisioned.

Generally, a Bayesian nonparametric model is used to determine whether an input sample should be classified as belonging to one or more different established categories or whether the input sample should be classified as belonging to a new, not-yet-established category. During processing, each established category may receive its own score representing a likelihood that the input sample belongs to the respective established category. Similarly, the category of "none," which represents that the input sample belongs to a new category that is not yet configured, will also receive a respective likelihood score. To determine the scores, each established category is associated with one or more reference feature vectors that may be compared to the input feature vector. These reference feature vectors are data representations of scenes that correspond to the established scene categories. The system compares the input sample feature vector to the reference feature vectors to determine a likelihood that the input matches an established category. If none of the established categories receive a sufficiently high likelihood score, the system may determine that "none" (i.e., a new category) is the likeliest category. Thus, Bayesian nonparametric techniques allow the system to identify new situations that do not best fit one of the established categories and enable system expansion and learning.

For example, a device may be configured with a number of established categories such as one person interacting with the device, two people having a conversation in front of the device, etc. In operation, the device may encounter a situation where no individuals are detected in proximity of the device, but a dog is detected, such as in the image data, audio data, etc. The system may construct a feature vector from the available data, including the image data, process that feature vector in view of the established categories, and determine that none of the established categories fit the scene described in the feature vector. The system may thus determine that a new category is appropriate. That new category may then be named (for example, "pet detected with no humans present") and behaviors configured for the device based on the new category (for example, threshold(s) to execute a command may be raised, as it is unlikely the pet is going to speak a command for the device in the absence of a human user present).

Certain variations of Bayesian nonparametric techniques allow for different variations of system operation. For example, the final likelihood(s) that an incoming scene sample (i.e., the feature vector of scene data) matches one or more established categories may be based on how often the established categor(y/ies) have been selected previously when classifying scenes for the device/system in question. This first variation is sometimes referred to as the "Chinese restaurant process" in the art. In this first variation, each potential category (including both established categories and the category of "none") is illustrated as a table at a restaurant where new diners are more likely to sit at a table where others are eating than at an empty table.

This first variation may use three different considerations when classifying a scene into a category (either established or "none"). The first consideration is the likelihood, which may be represented by the likelihood score discussed above. The second consideration is the prior classifications done by the system and/or device. These prior classifications may be represented by one or more prior scores. Each category (including each established category and the "none" category) may be associated with a prior score, representing some relative value as to how many previous times that particular category has been selected. The prior score may be represented in a number of ways, but in one embodiment the prior score is simply a count, representing the number of times that category has been previously selected. For example, a category may have a prior score of 113, indicating that that particular category has been selected in prior occasions, 113 times. In another example, the prior score may represent a portion of times a particular category from a total number of selections. For example, a particular category may have been selected 113 times, but all categories together have been selected 10,000 times. In this example, the particular category's prior score may be 113/10,000, which represents the number of times the particular category has been selected divided by the total number of category selections. The prior scores may be represented by Dirichlet distributions. Prior scores may be updated each time an input sample is processed for associate with a category. As can be envisioned, the prior score is configurable and may be structured in a number of different ways.

As the prior score reflects previous classifications by the system, when the system is first implemented an initial configured prior score may be set for each individual category. These configured starting prior scores may be referred to as the initial bias of the system. In addition to setting an initial bias for each individual category, the "none" category may also receive an initial bias, albeit potentially a small one. When the "none" category is selected and a new category is created, the prior score for the "none" category may not change from the initial bias. Rather, the newly established category receives the prior score (for example, 1) for the classification of the scene into the new category. Thus new categories may be created with incrementing prior scores based on their selection, while the initial bias for the "none" category may not change. The initial bias for the "none" category, and for the established categories, is configurable.

The third consideration of the first variation is a combination of the likelihood and the prior classifications. This third consideration may be called the posterior probability. The posterior probability is a representation of the adjusted likelihood, skewing the likelihood to make it more likely that a new scene is classified into a category that has been repeatedly selected before. Thus the posterior probability is estimated using the likelihood score and the prior score. The precise method of estimated the posterior probability is variable, and may be performed according to Bayesian nonparametric techniques known in the art. In one example, an input sample vector corresponding to a scene may be multiplied by a representative vector corresponding to an established category. The resulting vector product may be multiplied by each category's prior score to estimate a posterior probability that the scene corresponds to the particular category. As can be appreciated, each incoming data sample may be associated with multiple posterior probability scores, such as one for each category under consideration by the system.

The "none" category may not be associated with a representative feature vector. In this case, the posterior probability for an incoming scene to be associated with the "none" category may be equal to the initial bias for the "none" category discussed above. If this initial bias is greater than the calculated posterior probability for the established categories, the "none" category may be selected and a new category established.

Due to the complexity of these calculations, a specific posterior probability score may not be precisely calculable, but the relative posterior probabilities for each category for a particular input sample may be estimated, and thus the system may be able to infer a category to assign to the particular input sample based on these relative posterior probabilities. That is, the category with the highest estimated relative posterior probability may be selected as the category to which the incoming sample scene should be associated with. The system may then configure its operation based on the selected category.

A second variation of a Bayesian nonparametric technique involves the ability to associate more than one category with a particular input sample. For example multiple categories may each be associated with an input sample. Each associated category may have an association score indicating how closely the category matches the input sample. This second variation is sometimes referred to as the "Indian buffet process" in the art. In this second variation, each potential category (including both established categories and the category of "none") is illustrated as a food item available at a restaurant buffet where a diners may select varying quantities of each food item as desired.

In this second variation, multiple categories may be associated with an input sample. Depending on the system configuration, the categories may be assigned based on certain scene data (i.e., certain portions of the incoming feature vector). For example, one category may be associated with particular types of image data whereas another category may be associated with particular types of audio data. Thus, both categories may be associated with an input sample even though they are dependent on different kinds of data. Using this second variation, multiple smaller categories may be created based on different data types and more than one category may be selected to associate with an input sample. Further, using this Bayesian nonparametric variation the system may determine that certain established categories should apply and/or a new, not yet established category should also apply. For example, the system may determine that a certain category should apply based on image data in an input feature vector, but that the audio data of the input feature should be associated with a new category.

As an example of the second variation, a system may be configured with a dozen categories associated with video data, a hundred categories associated with audio data, ten categories associated with date/time data, seventeen categories associated with data regarding identified nearby users, and so on. During category selection one or more from each of these category types may be selected. For example, an input feature vector representing a scene of a lecture taking place in a classroom may be associated with one category indicating multiple users in image data, another category indicating a single individual speaking in audio data, another category indicating noise levels below a certain level in audio data, and another category indicating that a device with a teacher's user ID is present in a room with multiple devices with student user IDs. As can be appreciated, many different categories and configurations are possible.

Further, the second variation and the first variation are combinable. Thus, continuing with the restaurant analogy, a diner may be considered to be more likely to select a buffet item that has previously been selected. Thus the concepts of the prior, likelihood, and posterior probability discussed above with regard to the first variation may be incorporated into the second variation. Each prior score may be associated with a particular category, with the particular category's prior score being adjusted each time it is associated with an input sample. The adjustment to the prior score may be based on the particular category's association score. For example, a category having an association score of 75% with an input sample (representing a 75% likelihood that the category should be associated with the input sample) resulting in a smaller adjustment to the category's prior score than an association score of 95%. Or a simple selection of a category (meaning the category exceeded a threshold for selection) resulting in a same adjustment to the prior score. Such adjustments are configurable.

One consideration for data processing using the above techniques is that associating a category with an input sample feature vector is not necessarily a determinative process. That is, due to the complex calculations involved, the same input feature vector processed multiple times may not result in the same scores for each corresponding category each time. Each processing of the input feature vector may result in different probabilities associating the input feature vector with different categories. This is true for the Bayesian nonparametric techniques described above, as well as the first and second variations thereof, as well as for other data processing techniques. To account for this an input sample may be processed many times before one or more categories are inferred as associated with the input sample. For example, an input sample may be processed hundreds or thousands of times to determine what are the most frequent observations for potential category associations for the input sample. In order to perform these calculations, a distributed system such as that shown in FIG. 1 may be used, with scene data being sent from a particular local device 110 being sent to one or more servers 112, where the data is processed many times to determine associated categories. With powerful computing resources put to the task, the associating may be performed relatively quickly so that the operation of the system 100 and local device 110 may be configured based on the determined category(y/ies).

The system 100 may be configured to regularly process scene data corresponding to the scene of the local device 110 so that the device may conform its operation to the one or more categories associated with the scene. For example, the system 100 may be configured to update the scene categories every 60 seconds. In this manner the device 110 may adjust its configuration every minute based on changing conditions. In other configurations the system 100 may be configured to update the scene categories at different rates during different times. For example, the system 100 may only update the scene categories every hour between 1 a.m. and 6 a.m. but may update the scene categories more frequently during daytime hours. In another example, the system 100 may update the scene categories more frequently based on activity happening around the device 110. For example, if a new user is detected entering a room with the device 110, the system 100 may trigger a scene categorization. The user's presence may be detected using image data, audio data, device locator data, etc. Further, while the user is detected in the room with the device 110 the system 100 may call for more regular updates to the scene categories than if the room with the device 110 is empty. Processing regular or repeated scene data in this manner may avoid temporary changes in scene data (for example, a detected temporary loud noise) that may alter configurations of the system/device in an undesired manner.

A device 110 may be initially configured with a certain group of categories. Those categories may be selected based on categories that may apply to different users or different device locations. As each device 110 undergoes operation at its eventual location, new categories may be configured, either explicitly through user operations or instructions, or using techniques such as Bayesian nonparametric processing which allows selection of the new categories. New categories may eventually be labeled and/or further adjusted so that operation of the device 110 may be configured to account for how the device should operate using the new category. Various techniques may be applied to configure device operation for new categories.

Figure 2:
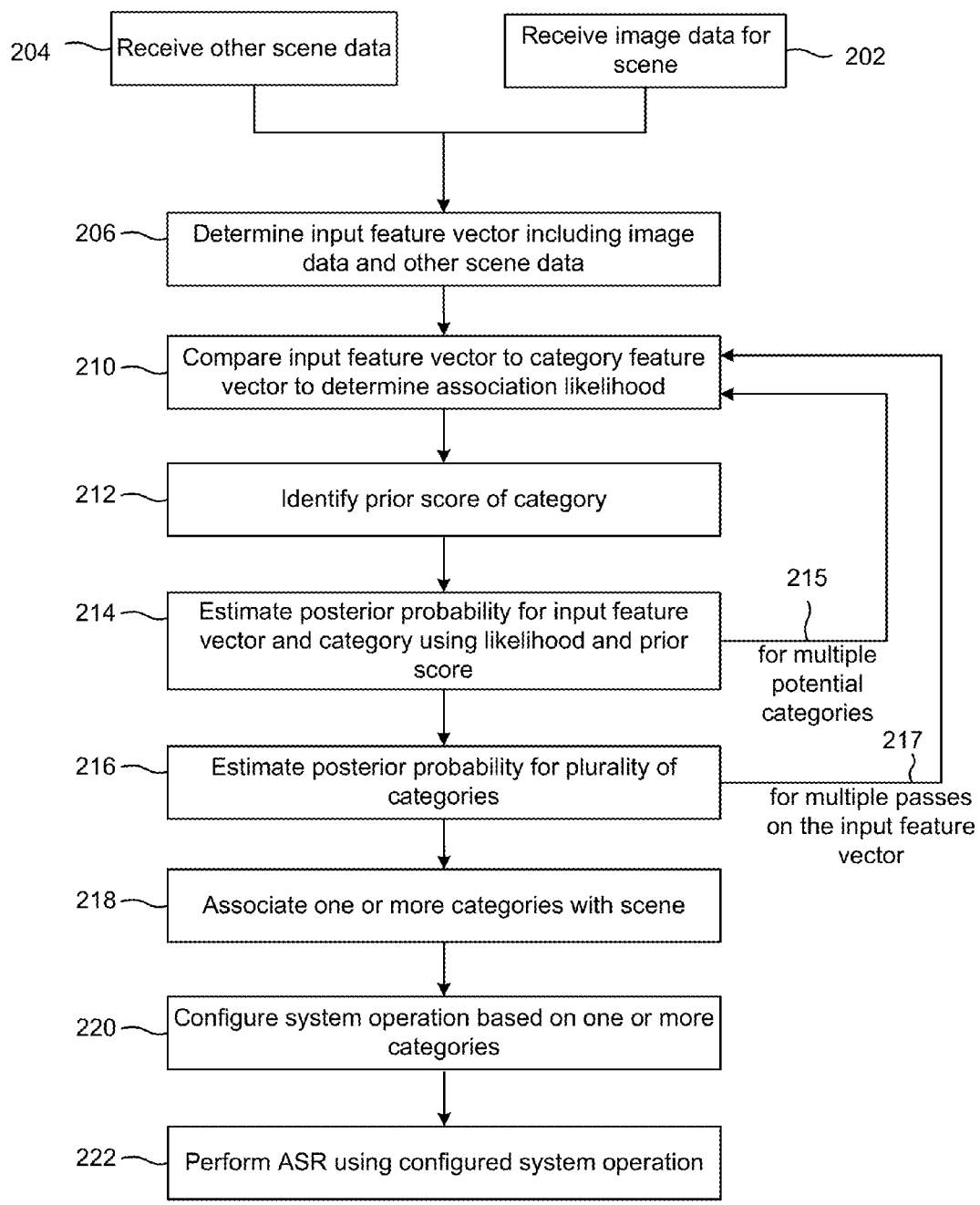
FIG. 2 illustrates an example method for categorizing a scene according to one embodiment of the present disclosure.

An example operation of the system is described in reference to FIG. 2. The steps described in FIG. 2 may be performed in any combination of a local device or remote server. The system receives (202) image data for a scene being experienced by a device of the system. The image data may come from a camera embedded with the device (such as camera 106) or with a camera separate from the device, but connected to the system (such as camera 106b). The system also receives (204) other scene data such as audio data (for example from embedded microphone 104 or separate microphone 104b), date/time data, data regarding proximate users, facial recognition data, identified speakers, etc. The system may receive other scene data from a local device or from other sources, for example other connected servers that can track other scene data that may be useful to the system. The system then determines (206) an input feature vector including the image data and other scene data. The input feature vector includes scene data used to categorize the scene and ultimately configure operation of one or more devices of the system.

The system then compares (210) the input feature vector to a category feature vector to determine an association likelihood representing the likelihood that the category of the feature vector corresponds to the input feature vector. This may include a dot product of the two feature vectors. The system may then identify (212) a prior score of the category and estimate (214) a posterior probability for the input feature vector and category using the association likelihood and the prior score. This may involve multiplying the likelihood by the prior score. The system may also estimate a posterior probability using other known techniques such as variational techniques, Monte Carlo sampling, approximate inference or other techniques. As illustrated by loop 215, the system may then repeat steps 210-214 for multiple categories for the input feature vector. Thus the system estimates (216) posterior probabilities for a plurality of categories. As illustrated by loop 217, the system may then repeat steps 210-216 (including loop 215) many times to perform multiple processing passes for the input feature vector. As described above, because the calculation of a posterior probability is non-deterministic, performing multiple passes for the input feature vector provides a more robust result when determine which categor(y/ies) to associate to the input feature vector. Based on the calculations of the multiple passes, the system may then associate (218) one or more categories with the scene represented by the input feature vector and configure (220) the system operation based on the one or more categories. The configuring may involving changing one or more settings of a device of the system so that the device behaves appropriately for the categor(y/ies) associated with the scene. The system may then perform ASR (222), such as interpreting a spoken command, using the configured system.

In one illustration of a system implementation, a set top box 110d may be installed at the front of a classroom. As part of the system, the set top box may be connected to multiple servers 112, cameras 106b, and microphones 104b. The set top box 110d may be configured to control various classroom equipment including lights, speakers, a projector, a computer, a wireless access point, and temperature controls. The set top box 110d may be configured with several established categories including "class in progress," "meeting in progress," "room vacant," and "teacher preparing." At 6:00 a.m. the set top box is associated with the "room vacant" category as the room lights are off, no individuals are seen in the image data, no sound is detected in the audio data, and no class is scheduled in the room (as determined from the time data and class schedule data available to the system). At 6:30 a.m. an individual enters the room and turns on the lights. The turning on of the lights triggers the system to perform a scene evaluation. The system obtains image data from the cameras 106b, which show a single individual in the room and the front classroom lights on but the back classroom lights off. The system obtains audio data room the microphones 104b and detects no speaking, only the sounds of a person moving about the front of the classroom. The system also obtains, accesses, and/or otherwise determines other scene data, such as the date and time, the expected classroom schedule, and the device identity of the individual who entered the room, which corresponds to the identity of the teacher expected to teach a class in the room beginning at 7:15 a.m. That scene data may be obtained from the set top box 110d or server 112. Other scene data may also be obtained. The system combines the scene data into an input feature vector describing the scene and begins processing.

The various categories of the set top box 110d may have different prior scores and different representative feature vectors. In the present example, the server 112 runs many different comparisons of the input feature vector to the representative feature vectors and determines that the scene most closely matches the "teacher preparing" category, and thus associates the scene with that category. The server 112 then send a message to the set top box 110d that the scene category is "teacher preparing." In response, the set top box 110d may adjust its operation accordingly. For example, the set top box 110d may communicate with the temperature to set a particular default temperature. The set top box 110d may also lower a parameter threshold for accepting audio commands (such as to activate the projector, etc.) as it is likely the individual will access the projector in the "teacher preparing" state. The set top box 110d may also communicate to the wireless access point to activate a wireless network to allow general network access. The set top box 110d also configures the system to perform a new scene evaluation every few minutes in case other individuals (i.e., students) begin to enter the classroom.

Continuing the illustration, at 7:10 the system performs another scene detection. Now the image data shows seven individuals in the classroom and the user ID data identifies the teacher and four student devices but no devices matching the other individuals. The audio data detects talking in the back of the room, but none in the front of the room. The time data shows 7:10 a.m. and class schedule data shows a class in that room starting at 7:15 a.m. The system may prepare a new input feature vector will the scene data, which the server will then process. The server may now determine that "class in progress" is the appropriate category for the scene and will inform the set top box 110d of the new category. In response, the set top box 110d may adjust its operation for the new category. For example, the set top box 110d may communicate with the temperature to lower the temperature in anticipation of more individuals in the room. The set top box 110d may also raise a threshold parameter for accepting audio commands, to avoid inadvertent activation of the projector (or other equipment) in response to a student speaking. The set top box 110d may communicate to the wireless access point to disable general network access and only allow secure network access, to prevent students accessing the network during class. The set top box 110d may also turn on the lights in the back of the room to illuminate the room according to desired during-class lighting.

As can be envisioned, many other examples of system operation are possible.

Various processes described above, including identifying one or more categories to associate to the scene data, may be performed using other machine learning techniques such as Bayesian parametric techniques, classifiers or other machine learning techniques. For example, the input feature vector may be input into a trained classifier in order to determine the category of the scene. The trained classifier applies one or more adaptive models to determine the category. The adaptive model may be stored in a database or may be integral to the classifier. The adaptive model determines whether patterns identified when the system was trained are or are not present in the input data. Examples of classifiers include Support Vector Machines (SVMs), neural networks, logistic regression, decision trees, AdaBoost (short for "Adaptive Boosting") combined with decision trees, and random forests. In some of these classifiers (e.g., neural networks), the models for different objects may not be discrete models, but rather, aspects of a single integrated model that can be used to estimate that an input feature vector of a scene corresponds to a scene category.

For example, a support vector machine (SVM) is a supervised learning model with associated learning algorithms that analyze data and recognize patterns, such as the patterns in images, used for classification and regression analysis. Given a set of training examples, each marked as belonging to one of two categories, an SVM training algorithm builds a model that assigns new examples into one category or the other, making it a non-probabilistic binary linear classifier. An SVM model may be mapped so that the examples of the separate categories are divided by a clear gap. New examples are then mapped into that same space and predicted to belong to a category based on which side of the gap they fall on. For example, an SVM model may be used to make a binary prediction regarding an image quality, specifically whether a person is shown in an image.

To train the classifier many different samples of sets of scene data, including image data, are labeled, with specific feature values and specific situations (i.e., party, single user, lecture, etc.). After analyzing the many samples, a model may be constructed to evaluate input images. The model may be stored by a device or server and then may be used during runtime to analyze the input data to classify the situation.

Figure 3:
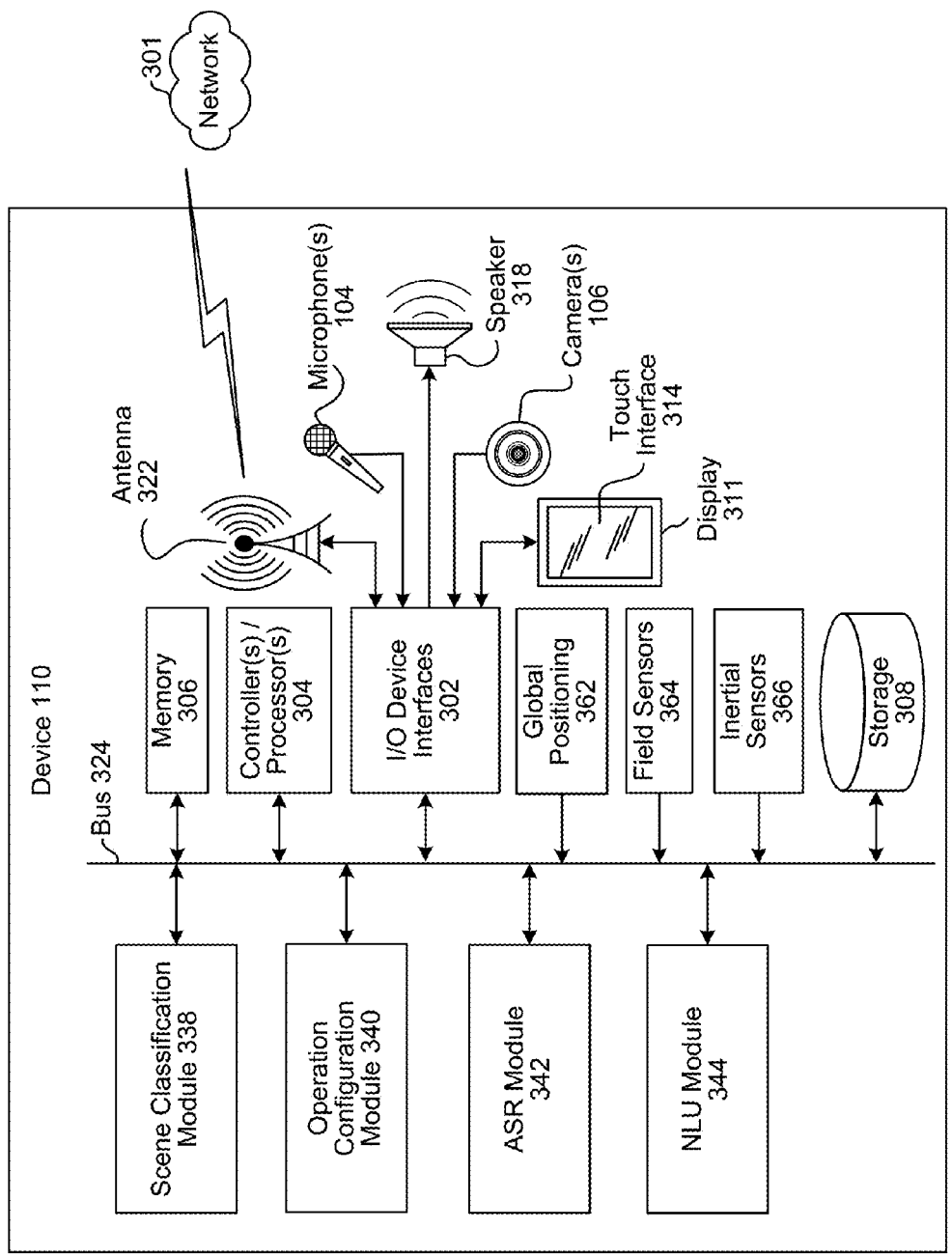
FIGS. 3 and 4 illustrate block diagrams conceptually illustrating components of a system including one or more of an electronic device and a remote server.
Figure 4:
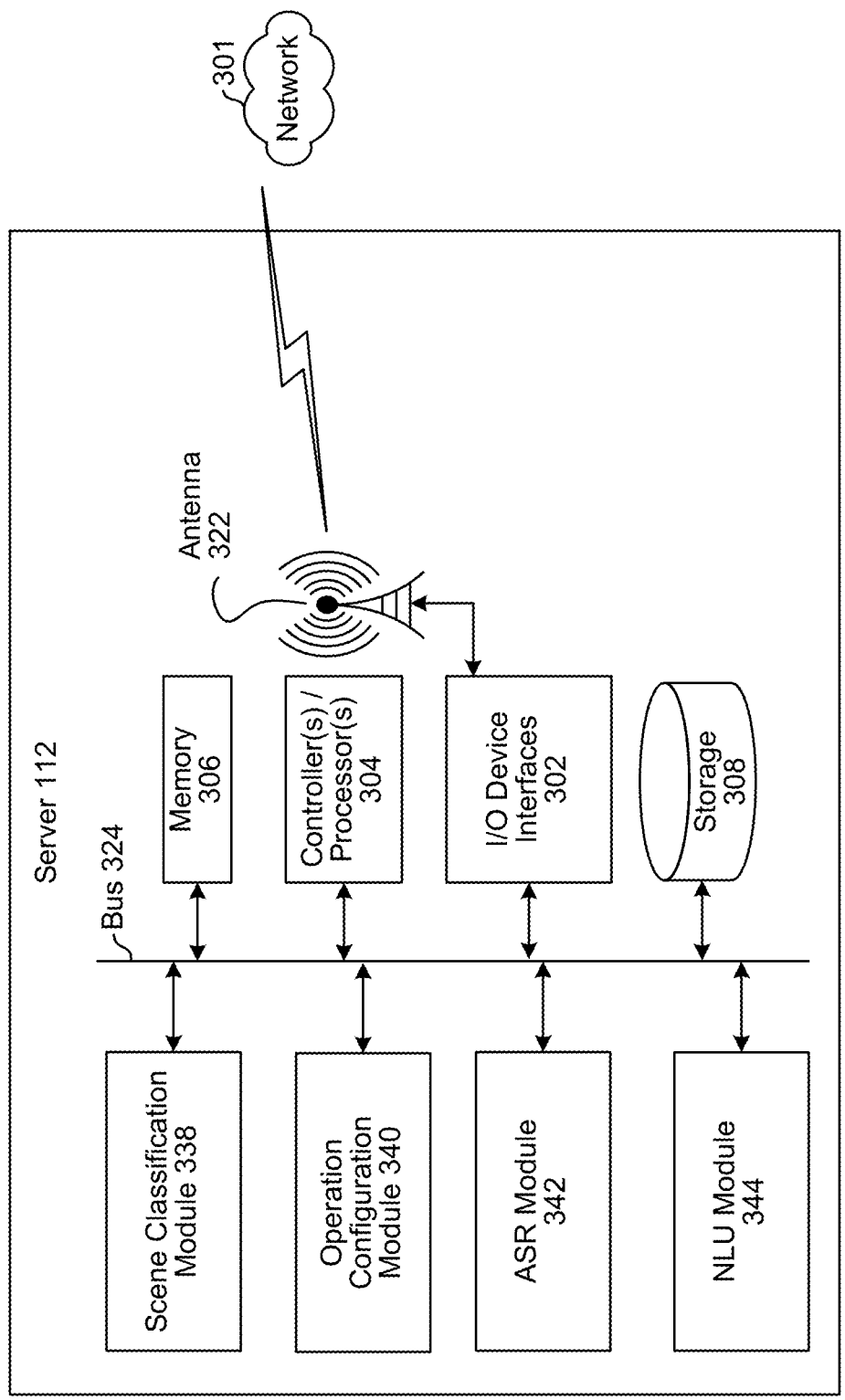

FIGS. 3 and 4 illustrate block diagrams conceptually illustrating components of a system 300 including one or more of a device 110 and a remote server 112. Depending upon how the system is structured, some of the components illustrated in FIG. 3 as part of the device 110 or in FIG. 4 as part of the remote server 112 may be included only in the device 110 or in the server 112, or may be distributed across multiple devices 110 and/or servers 112. Other components not illustrated may also be included in the device 110 and/or the server 112. In operation, the system 100 may include computer-readable and computer-executable instructions that reside in storage 308 on the device 110 and/or server 112. The device 210 may be designed as a stationary device such as a set-top box or as a portable device, such as an electronic reader, a smart phone, tablet, or the like. The server 212 may be a single server or a group of servers.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, set top boxes, etc. The device 110 may also be a component of other devices or systems that may provide speech processing functionality, such as automated teller machines (ATMs), kiosks, home appliances (such as refrigerators, ovens, etc.), vehicles (such as cars, buses, motorcycles, etc.), and/or exercise equipment, for example.

The device 110 and/or server 112 may include one or more controllers/processors 304 comprising one-or-more central processing units (CPUs) for processing data and computer-readable instructions, and a memory 306 for storing data and instructions. The memory 306 may include volatile random access memory (RAM), non-volatile read only memory (ROM), non-volatile magnetoresistive (MRAM) and/or other types of memory. The device 110 and/or server 112 may also include a data storage component 308 for storing data and processor-executable instructions. The data storage component 308 may include one or more non-volatile storage types such as magnetic storage, optical storage, solid-state storage, etc. The device 110 and/or server 112 may also be connected to a removable or external non-volatile memory and/or storage (such as a removable memory card, memory key drive, networked storage, etc.) through the input/output device interfaces 302.

Executable instructions for operating the device 110 and/or server 112 and their various components may be executed by the controller(s)/processor(s) 304, using the memory 306 as temporary "working" storage at runtime. The executable instructions may be stored in a non-transitory manner in non-volatile memory 306, storage 308, or an external device. Alternatively, some or all of the executable instructions may be embedded in hardware or firmware in addition to or instead of software.

As shown in FIG. 3, the device 110 may include one or more of a variety of sensors. Among the sensors are an audio capture component such as microphone(s) 104, an image and/or video capture component such as camera(s) 106. "Camera" includes image capture systems used to capture images, and includes (among other things), cameras used for photography and for the capture of video. The camera(s) may be internal or external to the device 110, for example the device may be connected to one or more cameras (such as camera 106b in FIG. 5) installed in a business or a home and use the images from the various cameras as part of the situation analysis discussed above. The device 110 may also include a touch interface 314, an antenna 322, global positioning sensors 362, field sensors 364 (e.g., a 3-axis magnetometer, a gravity sensor), and inertial sensors 366 (e.g., a 3-axis accelerometer, a 3-axis gyroscope). The device 110 may also include one or more buttons (not shown) or other input components such as a keyboard (not shown). Several of each of these components may be included. Also, although shown as integrated within device 110, some or parts of the various sensors may be external to device 110 (such as augmented reality (AR) glasses 110a in FIG. 5, etc.) and accessed through input/output device interfaces 302 either wirelessly or through a physical connection. The sensors may produce output data that may be used in determining movement signatures, as explained below.

The antenna 322 and related components (e.g., radio transmitter/receiver/transceiver, modem, etc.) may be configured to operate with a network 301, for example a wireless local area network (WLAN) (such as WiFi), Bluetooth, and/or wireless networks, such as a Long Term Evolution (LTE) network, WiMAX network, 3G network, etc.

The audio capture component may be, for example, a microphone 104 or array of microphones, a wired or wireless headset (not illustrated), etc. If an array of microphones is included, an approximate distance to a sound's point of origin may be determined using acoustic localization based on time and amplitude differences between sounds captured by different microphones of the array.

The touch interface 314 may be integrated with a surface of a display 311 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The global positioning module 362 provides an interface for acquiring location information, such as information from satellite geographic positioning system(s). For example, the global positioning module 362 may include a Global Positioning System (GPS) receiver and/or a Global Navigation Satellite System (GLONASS) receiver. The global positioning module 362 may also acquire location-based information using other radio sources (e.g., via antenna 322), such as mapping services that triangulate off of known WiFi service set identifiers (SSIDs) or cellular towers within range of the device 110.

The field sensor module 364 provides directional data. The field sensor module 364 may include a 3-axis magnetometer that measures magnetic fields and may serve as a compass. The field sensor module 364 may also include a dedicated gravity sensor to determine up-and-down. The inertial sensor module 366 provides inertial data, and may include 3-axis accelerometer and a 3-axis gyroscope. Examples of other sensors include an electronic thermometer to measure ambient temperature and a proximity sensor to detect whether there is an object within a certain distance of the device 110.

Sensors may be communicatively coupled with other components of device 110 via input/output (I/O) device interfaces 302 and/or via an address/data bus 324. The address/data bus 324 conveys data among components of the device 110 and/or server 112. Each component within the device 110 and/or server 112 may also be directly connected to other components in addition to (or instead of) being connected to other components across the bus 324.

The I/O device interfaces 302 may connect to a variety of components and networks. Among other things, the I/O device interfaces 302 may include an interface for an external peripheral device connection such as universal serial bus (USB), FireWire, Thunderbolt or other connection protocol. The input/output device interfaces 302 may also support a variety of networks via an Ethernet port and antenna 322. Examples of other I/O devices may include motion sensors, smartwatches, accelerometers, muscle movement/electrical signal monitors or any other devices configured to detect movement and/or gestures.

The device 110 may also include a video output component for displaying images, such as display 311. The video output component may be a display of any suitable technology, such as a liquid crystal display, an organic light emitting diode display, electronic paper, an electrochromic display, a pico projector, etc. The video output component may be integrated into the device 110 or may be separate. For example the device may be "headless," as in may not have a built-in device. Rather the device 110 may connect to one or more displays remotely through the input/output device interfaces 302 or other components.

The device 110 may also include an audio output component such as a speaker 318, a wired or wireless headset (not illustrated). Other output devices include a haptic effect generator (not illustrated). The haptic effect generator may be of any haptic technology, including technologies to vibrate the entire device 110 (e.g., electromagnetic technologies such as vibratory motor or a coil with a central mass) and/or may comprise technologies allowing the haptic effect to be localized to a position of the touch interface 314, such as electroactive polymers, piezoelectrics, electrostatics, subsonic audio wave surface actuation, etc.

As discussed above, device 110 and/or server 112 includes controller(s)/processors 304, memory 306, and storage 308. In addition, the device 110 and/or server 112 may include a scene classification module 338 and/or operation configuration module 340, ASR module 342, NLU module 344, or other components. Each of these components may comprise processor-executable instructions stored in storage 308 to be executed by controller(s)/processor(s) 304 (e.g., software, firmware), hardware, or some combination thereof. For example, components of the scene classification module 338 and the operation configuration module 340 may be part of a software application running in the foreground and/or background on the device 110. In another example, an operation configuration module 340 may reside on a device 110 whereas a scene classification module 338 may reside on server 112. Other configurations are also possible. If the scene classification module 338 resides on the device 110, the device may determine a category of the device's environment using operations executed by the scene classification module 338. If the scene classification module 338 does not reside on the device 110, but rather on the server 112, the device may determine a category of the device's environment by receiving a communication from the server 112, where the server indicates the category (or other instruction) in the communication.

The modules 338-344 may be connected to the bus 324, input/output interfaces 302, controller/processor 304, and/or other component of the device 110 and/or server 112. For example, data sent to the scene classification module 338 may come from the storage 308 or the input/output interfaces 302, such as image data sent to the device 110 and/or server 112 over a network.

The scene classification module 338 is configured to receive scene data and to determine one or more categories that apply to the scene based on the scene data, as described above. For example, the scene classification module may be configured to perform operations 202-218 described above in reference to FIG. 2. The operation configuration module 340 may then configure operation of the system, for example device 110, based on the selected scene categor(y/ies). For example, parameters used to process speech and/or commands may be adjusted depending on the category. In another example, certain commands may be executed or communicated to other devices based on the category. The server 112 may include an operation configuration module 340. Using the operation configuration module 340, the server 112 may send an instruction to device 110 to, for example, adjust a speech processing parameter (such as an ASR or NLP threshold), execute certain commands, etc.

The ASR module 342 may process received audio including speech into text. The ASR module 342 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 342 which then interprets the utterance based on the similarity between the utterance and models known to the ASR module 342. For example, the ASR module 342 may compare the input audio data with models for sounds (e.g., subword units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned recognition score, the ASR module 342 may output the most likely words recognized in the audio data. The ASR module 342 may also output multiple alternative recognized words in the form of a lattice or an N-best list with corresponding probability scores.

The ASR module 342 may include an acoustic front end (AFE) and a speech recognition engine. The AFE transforms audio data into data for processing by the speech recognition engine. The speech recognition engine compares the speech recognition data with the acoustic, language, and other data models and information for recognizing the speech contained in the original audio data. The AFE may reduce noise in the audio data and divide the digitized audio data into frames representing a time intervals for which the AFE determines a set of values, called a feature vector, representing the features/qualities of the utterance portion within the frame. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. The speech recognition engine may process the output from the AFE with reference to information stored in speech storage. Alternatively, post front-end processed data (such as feature vectors) may be received by the ASR module 342 from another source besides the internal AFE. For example, another entity, such as local device 140, may process audio data into feature vectors and transmit that information to the server 112 across a network 302. Feature vectors may arrive at the server 112 encoded, in which case they may be decoded prior to processing by the speech recognition engine The speech recognition engine attempts to match received feature vectors to language phonemes and words as known in the speech storage. The speech recognition engine computes recognition scores for the feature vectors based on acoustic information and language information. The acoustic information is used to calculate an acoustic score representing a likelihood that the intended sound represented by a group of feature vectors match a language phoneme. The language information is used to adjust the acoustic score by considering what sounds and/or words are used in context with each other, thereby improving the likelihood that the ASR module outputs speech results that make sense grammatically.

The speech recognition engine may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the ASR module 342 to another component of the device 110 and/or server 112 or to the input/output interfaces 202 for sending to an external device. For example, ASR results in the form of a textual representation of the speech, an N-best list, lattice, etc. may be sent to a natural language understanding (NLU) module 344 for natural language processing, such as conversion of the text into commands for execution.

The NLU module 344 may include various components, including potentially dedicated processor(s), memory, storage, etc. The NLU module 344 takes textual input (such as from text recognition module 340, ASR module 342, or otherwise) and attempts to make a semantic interpretation of the text. That is, the NLU module 344 determines the meaning behind the text based on the individual words and then implements that meaning. In doing so the NLU may perform operations such as entity recognition, entity resolution, domain classification, intent classification, etc. The NLU module 344 interprets a text string (such as the text output by the ASR module 342) to derive an intent or a desired action from the user as well as the pertinent pieces of information in the text that let allow the device 110 and/or server 112 to complete that action. For example, if a spoken utterance is processed by an ASR module and outputs the text "call mom" the NLU module 344 will determine that the user intended to activate a telephone in his/her device and to initiate a call with a contact matching the entity "mom." The NLU module 344 may be configured to annotate text as part of NLU processing. For example, for the text "call mom," "call" may be annotated as a command (to execute a phone call) and "mom" may be identified as a specific entity and target of the command (and the telephone number for the entity corresponding to "mom" stored in a contact list may be included in the annotation). To correctly perform NLU processing of speech input the NLU may be configured to communicate with a variety of other components/applications of a device such as a phone, contact list, calendar, music player, etc.

The NLU processing is based on the models and programming available to the NLU module 344. Such models may be grammar based, rule based or constructed in a different manner. The NLU may store one or more training corpuses that may include precoded text and/or the corresponding commands that go with the text, that may be used to train and improve the models used by the NLU module 344 in natural language understanding. The training corpuses may be used to train the NLU models, which may then be used during NLU processing.

In this manner the NLU module 344 may initiate instructions to other components/applications of a device in order to perform actions the NLU modules 344 determines have been commanded by a user. NLU processing may be performed by a local device 110 or by a remote device, such as server 112. If performed by a remote device, the remote device may then send instructions to the local device to perform operations based on the NLU results. Or results of the command may be sent to the local device 110 from the server 112. For example, if the command is to play music from a cloud music service, the music may be sent from the server 112 to the local device 110.

Figure 5:
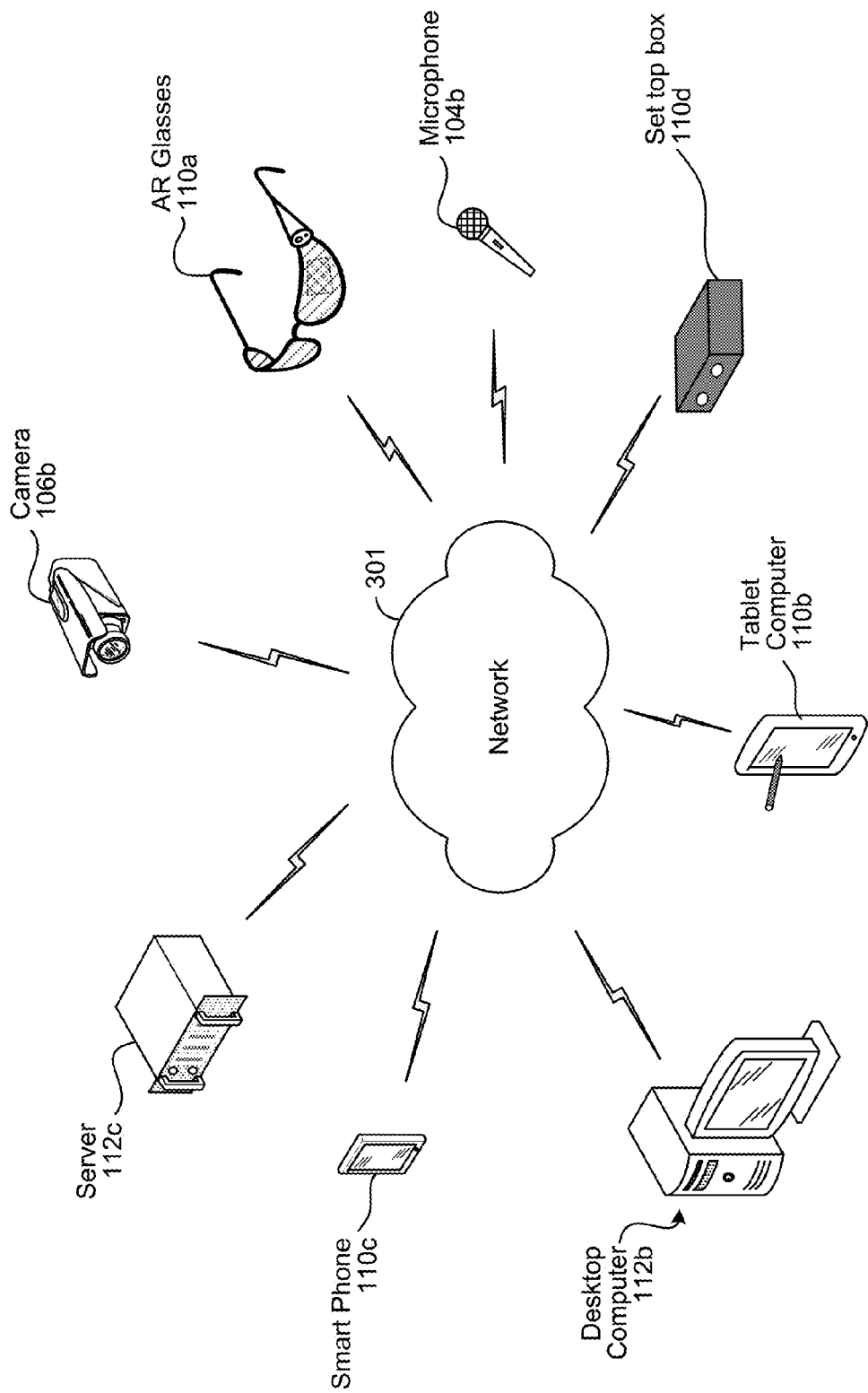
FIG. 5 illustrates an example of a computer network for use with the present system.

As shown in FIG. 5, multiple devices may be connected over a network 301. The network 301 may include a local or private network or may include a wide network such as the internet. Devices may be connected to the network 301 through either wired or wireless connections. For example, a smart phone 110c may be connected to the network 301 through a wireless service provider. Other devices, such as desktop computer 112b and/or server 112c, may connect to the network 301 through a wired connection. Other devices, such as set top box 110d or tablet computer 110b may be capable of connection to the network 301 using various connection methods including through a wireless service provider, over a WiFi connection, or the like. Various visual input devices (i.e., cameras) may be connected to networked devices either through a wired or wireless connection. Networked devices may also include embedded visual or audio input devices, such as internal cameras or microphones in set top box 110d, smart phone 110c, or tablet computer 110b or to other stand-alone cameras such as camera 106b or other stand-alone microphones such as microphone 104b.

The above examples are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, image processing, and optical character recognition (OCR) should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more components of the modules 338-344 may be implemented as firmware in hardware. For example, portions of the ASR module 342 or NLU module 344 may be implemented as a digital signal processor (DSP) and/or application-specific integrated circuit (ASIC).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving image data, the image data corresponding to an operating environment of a device;
   receiving audio data, the audio data corresponding to the environment;
   constructing a first feature vector using at least the image data and the audio data;
   processing the first feature vector using a Bayesian nonparametric technique to associate an environment category to the environment, the technique comprising:
      comparing the first feature vector to a reference feature vector, the reference feature vector corresponding to a first environment category,
      determining an association likelihood based on the comparing, the association likelihood indicating a likelihood that the first environment category describes the operating environment of the device,
      determining a prior score for the first environment category, the prior score based on an initial bias, wherein the initial bias is determined using a number of times the first environment category has been selected previously,
      determining an adjusted score for the first environment category using the association likelihood and the prior score,
      determining a new category score representing a likelihood that the first feature vector does not correspond to any established environment category, the new category score based on the initial bias,
      comparing the adjusted score to the new category score, and
      selecting the first environment category as corresponding to the environment based on the adjusted score being higher than the new category score; and
   setting a speech processing parameter of the device based on the selected first environment category.

2. The computer-implemented method of claim 1, wherein the speech processing parameter comprises a parameter for detecting a wake word.

3. A computer-implemented method comprising:
   receiving image data relating to an operating environment of a device;
   computing, based on the image data, a first likelihood score representing a first likelihood that the operating environment corresponds to a first established environment category;
   determining a first prior score for the first established environment category, the first prior score representing a number of times the first established category has been selected previously;
   determining a first score based on the first likelihood score and the first prior score;
   computing, based on the image data, a second likelihood score representing a second likelihood that the operating environment corresponds to a new environment category;
   determining a second score based at least in part on the second likelihood score;
   selecting a first category of the environment, the first category selected based at least in part on the first score and the second score; and
   selecting an operating parameter of the device based on the first category.

4. The computer-implemented method of claim 3, wherein determining the first score and determining the second score comprise using Bayesian nonparametric techniques.

5. The computer-implemented method of claim 4, wherein:
   selecting the first category comprises selecting the first established environment category based on the first score being higher than the second score.

6. The computer-implemented method of claim 4, wherein selecting the first category comprises selecting the first established environment category, the method further comprising:
   computing, based on the image data, a third likelihood score representing a third likelihood that the operating environment corresponds to a second established environment category;
   determining a second prior score for the second established environment category, the second prior score representing a number of times the second established category has been selected previously;
   determining a third score based on the third likelihood score and the second prior score; and
   selecting the second established environment category as a second category of the environment, the second category selected based at least in part on the third score,
   wherein the selecting of the operating parameter is further based on the second category.

7. The computer-implemented method of claim 4, wherein the selecting the first category comprises:
   determining the second score is higher than the first score;
   creating a new established category using the image data; and
   selecting the new established category as the first category.

8. The computer-implemented method of claim 3, wherein:
   the first category is further selected based at least in part on second data;
   the second data includes at least one of audio data, date data, time data, data regarding users proximate to the device, location data, or historical data describing previous operation of the device.

9. The computer-implemented method of claim 3, wherein:
the operating parameter comprises a scheduled determination of a new category based on the selected first category.

10. The computer-implemented method of claim 3, wherein the operating parameter comprises a speech processing parameter related to interpreting received audio as a spoken command.

11. The computer-implemented method of claim 3, wherein the second score is based on the second likelihood score and a configured initial bias for new category selection.

12. A computing system comprising:
at least one processor;
a memory including instructions operable to be executed by the at least one processor to perform a set of actions comprising:
  receiving image data relating to an operating environment of a device;
  computing, based on the image data, a first likelihood score representing a first likelihood that the operating environment corresponds to a first established environment category;
  determining a first prior score for the first established environment category, the first prior score representing a number of times the first established category has been selected previously;
  determining a first score based on the first likelihood score and the first prior score;
  computing, based on the image data, a second likelihood score representing a second likelihood that the operating environment corresponds to a new environment category;
  determining a second score based at least in part on the second likelihood score;
  selecting a first category of the environment, the first category selected based at least in part on the first score and the second score; and
  selecting an operating parameter of the device based on the first category.

13. The computing system of claim 12, wherein determining the first score and determining the second score comprise using Bayesian nonparametric techniques.

14. The computing system of claim 13, wherein:
selecting the first category comprises selecting the first established environment category based on the first score being higher than the second score.

15. The computing system of claim 13, wherein selecting the first category comprises selecting the first established environment category, the set of actions further comprising:
  computing, based on the image data, a third likelihood score representing a third likelihood that the operating environment corresponds to a second established environment category;
  determining a second prior score for the second established environment category, the second prior score representing a number of times the second established category has been selected previously;
  determining a third score based on the third likelihood score and the second prior score; and
  selecting the second established environment category as a second category of the environment, the second category selected based at least in part on the third score,
  wherein the selecting of the operating parameter is further based on the second category.

16. The computing system of claim 13, wherein the selecting the first category comprises:
  determining the second score is higher than the first score;
  creating a new established category using the image data; and
  selecting the new established category as the first category.

17. The computing system of claim 12, wherein:
the first category is further selected based at least in part on second data;
the second data includes at least one of audio data, date data, time data, data regarding users proximate to the device, location data, or historical data describing previous operation of the device.

18. The computing system of claim 12, wherein:
the operating parameter comprises a scheduled determination of a new category based on the selected first category.

19. The computing system of claim 12, wherein the operating parameter comprises a speech processing parameter related to interpreting received audio as a spoken command.

20. The computing system of claim 12, wherein the second score is based on the second likelihood score and a configured initial bias for new category selection.

* * * * *